(12) United States Patent
Hertwig et al.

(10) Patent No.: US 9,833,786 B2
(45) Date of Patent: Dec. 5, 2017

(54) DISTRIBUTING DEVICE FOR SOLIDS-CONTAINING LIQUIDS

(71) Applicant: Hugo Vogelsang Maschinenbau GmbH, Essen (DE)

(72) Inventors: Martin Hertwig, Essen/Olbg. (DE); Paul Krampe, Essen/Olbg. (DE)

(73) Assignee: Hugo Vogelsang Maschinenbau GmbH, Essen (DE)

( * ) Notice: Subject to any disclaimer, the term of this patent is extended or adjusted under 35 U.S.C. 154(b) by 503 days.

(21) Appl. No.: 14/490,757

(22) Filed: Sep. 19, 2014

(65) Prior Publication Data

US 2015/0076261 A1 Mar. 19, 2015

(30) Foreign Application Priority Data

Sep. 19, 2013 (DE) .................... 20 2013 008 267 U

(51) Int. Cl.
| | |
|---|---|
| *B02C 18/00* | (2006.01) |
| *B02C 18/06* | (2006.01) |
| *B02C 18/02* | (2006.01) |
| *A01C 23/00* | (2006.01) |
| *A01C 3/06* | (2006.01) |

(52) U.S. Cl.
CPC ............... *B02C 18/06* (2013.01); *A01C 3/06* (2013.01); *A01C 23/002* (2013.01); *B02C 18/02* (2013.01)

(58) Field of Classification Search
CPC ......... A01C 23/002; A01C 3/06; A01C 23/00; B02C 18/06; B02C 18/14

USPC ............................................ 241/46.04, 46.06
See application file for complete search history.

(56) References Cited

FOREIGN PATENT DOCUMENTS

| DE | 202011050654 U1 | 10/2011 |
|---|---|---|
| EP | 1656822 A1 | 5/2006 |
| EP | 1915895 A2 | 4/2008 |

OTHER PUBLICATIONS

New Zealand Patent Application No. 700200, 5 pages, Examination Report dated Aug. 17, 2015.
European Patent Application No. 14185504.9, Search Report dated Jan. 27, 2015.

*Primary Examiner* — Faye Francis
(74) *Attorney, Agent, or Firm* — Kilpatrick Townsend & Stockton LLP; Dean W. Russell; Renae Bailey Wainwright

(57) ABSTRACT

The invention relates to a distributing device for liquids, particularly for solids-containing liquids, comprising: a distribution chamber with an inlet opening that leads to a chamber interior space of the distribution chamber, a first perforated blade disc with several outlet openings that connect the chamber interior space to several connection ports, and a blade drive shaft that is swivel-mounted about a drive shaft axis. According to the invention, a first eccentric member, which is connected to the blade drive shaft and defines a first eccentric axis lying at a distance to the drive shaft axis, and a first cutting blade are provided, which first cutting blade is connected to the first eccentric member and has a cutting edge that rests against the first perforated blade disc and can be moved relative to the first perforated blade disc by means of the first eccentric member.

27 Claims, 9 Drawing Sheets

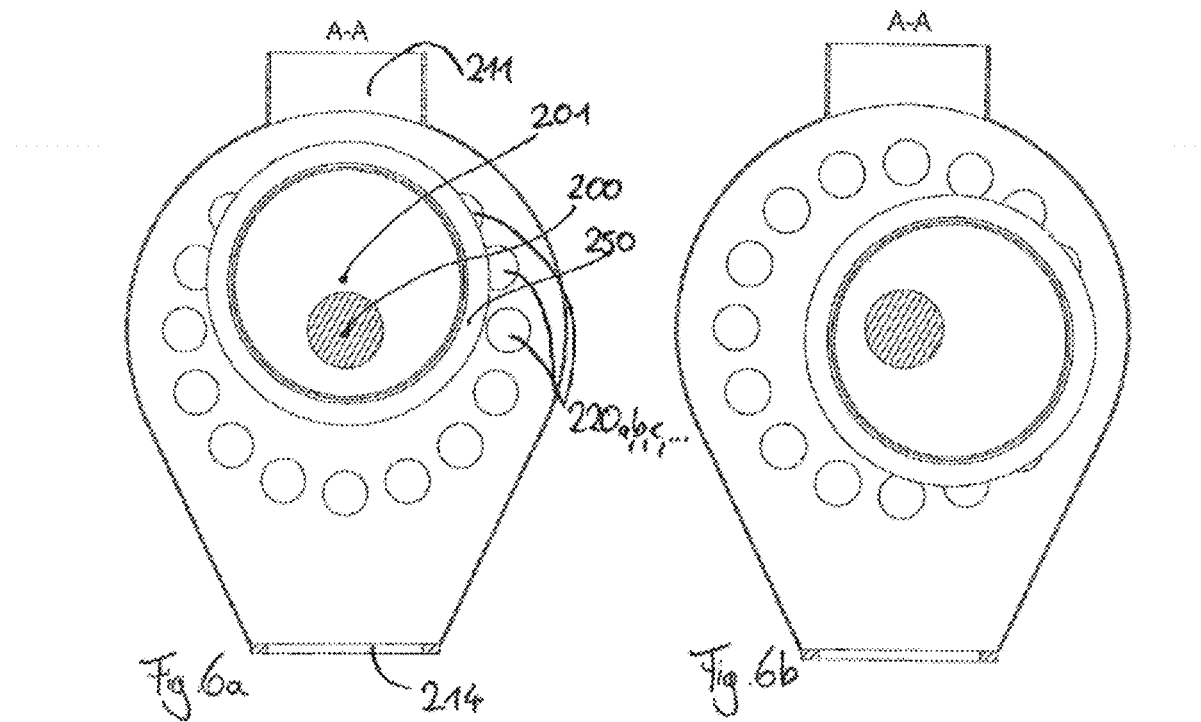
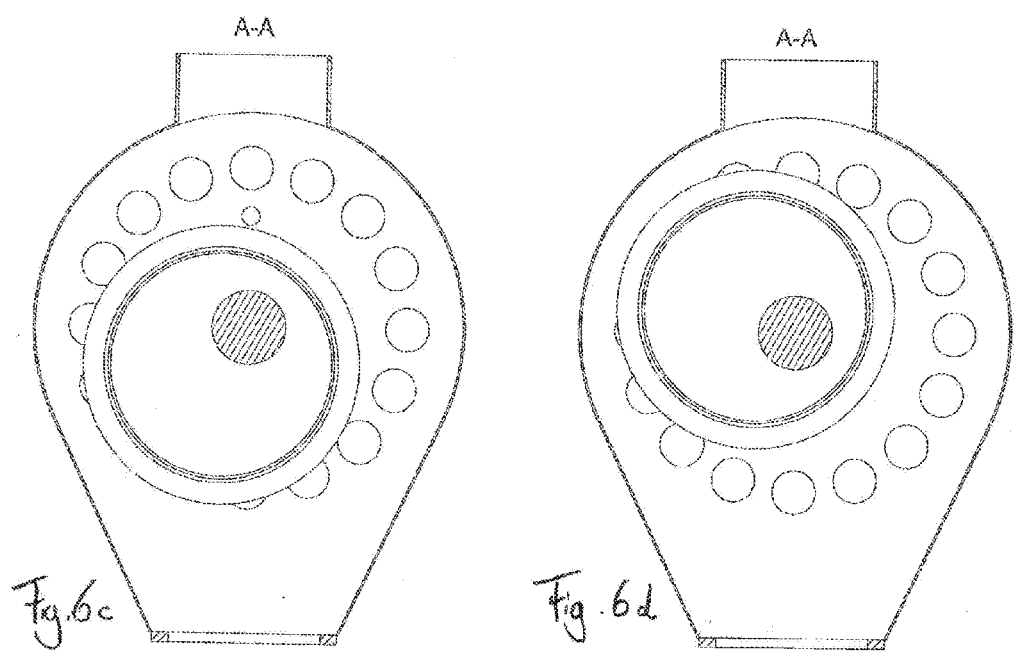

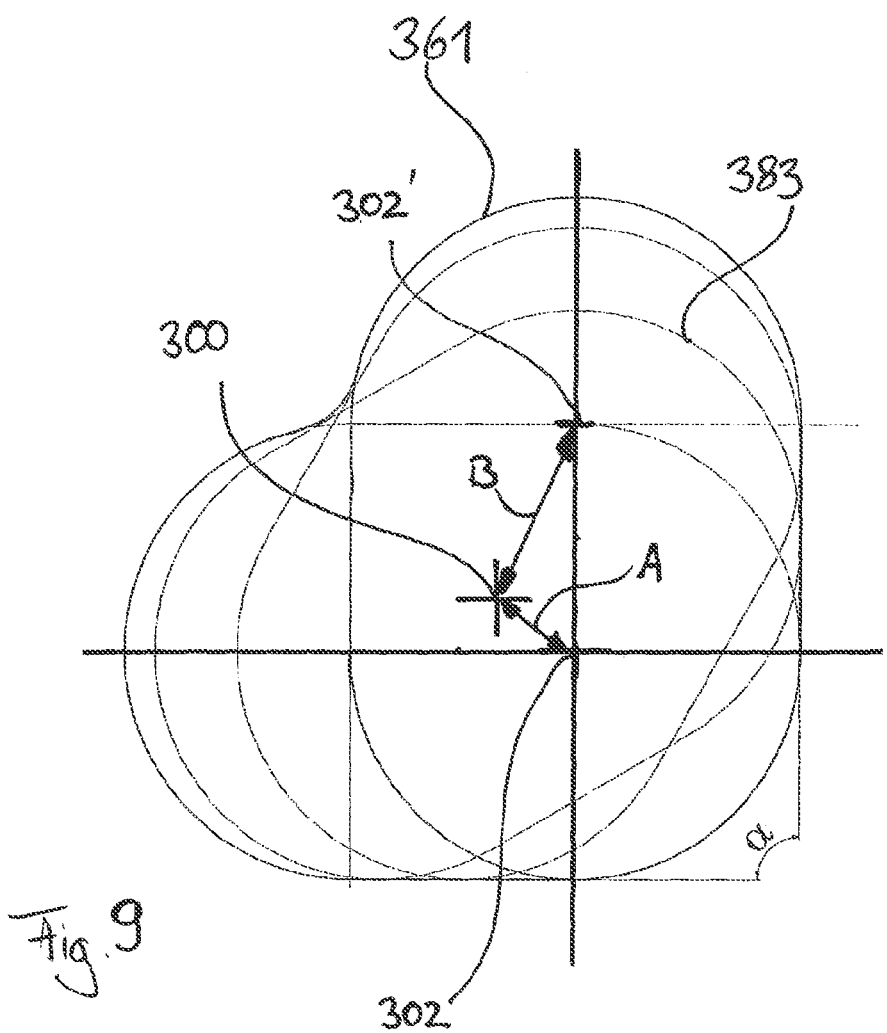

DISTRIBUTING DEVICE FOR SOLIDS-CONTAINING LIQUIDS

CROSS-REFERENCE TO RELATED APPLICATION

This application claims priority to German Patent Application No. 20 2013 008 267.4 filed on Sep. 19, 2013, the contents of which are incorporated herein by reference.

FIELD OF THE INVENTION

The invention relates to a distributing device for liquids, particularly for solids-containing liquids.

BACKGROUND OF THE INVENTION

Distributing devices for solids-containing liquids are used in various applications, one typical example being used in agricultural technology for the application of slurry, for example. Here, the task of the distributing device lies in distributing the solids-loaded liquid from a tank to several openings, for example in order to deliver it via several openings in a spatially targeted manner and at a properly dosed delivery rate. One typical application is the application of slurry via a drag hose device in which the slurry is distributed from the slurry tank to several, for example 5 to 100, hoses in order to achieve a spatially targeted and properly dosed application thereof.

One fundamental problem that arises in such distributor units results from the fact that, due to the nature of the system, the solids-loaded liquid must be distributed from a feed line with a large cross section to several feed lines, each having a small cross section. Due to the solids in der liquid, the danger of clogging arises in the small sections in this system-determined process. It is fundamentally known to couple distribution devices for solids-loaded liquids with a cutting device in order to resolve this problem. As a result of such a cutting device, the solids in the liquid are made smaller, which reduces the danger of clogging in the small cross sections of passage in and behind the distributing device. For example, a cutting device integrated into the distribution device is known that has cutting blades which, in conjunction with a perforated disc, exert a shearing action on the solids when they pass through the holes of the perforated disc. The cutting blade is moved relative to the perforated disc in order to produce this shearing action. The holes in the perforated disc correspond to the outlet openings of the distribution device and are in fluid communication with these outlet openings.

Another problem that arises in distribution devices of the type cited at the outset is that the distribution devices must be operated in different load states characterized by the use of all of the outlet openings in one load state and the use of only some of the outlet openings, in which the other outlet openings are closed. It is desirable to be able to economically operate the distribution devices even in such different load states and a reliable and uniform distribution of the solids-loaded liquid with effective size-reduction of the solids.

Another problem associated with the distribution of solids-loaded liquids lies in the great variability that such liquids have with respect to the flow-related characteristics. For instance, on the one hand, solids-loaded liquids can be characterized by a low or a high solids content, which is typically characterized as solids volume per liquid volume or solids volume with respect to the total volume. On the other hand solids-loaded liquids can differ greatly in terms of the material and geometric characteristics of the solid components; for example, the solid components can have a low or high resistance to shearing forces, a compact, for example spherical geometry or an oblong or plate-like geometry in the manner of fibers or sheets, and they can of course differ in general in terms of their absolute dimensions. Finally, the liquid containing the solids can also have different viscosities. For these reasons, it is known to prepare distribution devices for solids-loaded liquids in a multiplicity of variants, for example with small or larger outlet openings, one, two, three or more cutting blades, perforated disc blades with different geometries and numbers of holes as well as different relative speeds between the cutting members and the perforated disc. It is true that an oftentimes sufficient adaptation to certain characteristics of the solids-loaded liquid and hence a good distribution of a solids-loaded liquid are achieved by this adaptation of the geometric, materials-related and operating point-related parameters of a distribution device. However, this type of construction in previously known distribution devices has the drawback that it is only possible to reach to changes in the characteristics of the solids-loaded liquid in a limited manner by changing the operating parameters, for example the relative speed between cutting blade and perforated disc, and it is frequently necessary to change out mechanical components of the distribution device in order to switch the distribution device from the distribution of a solids-loaded liquid to the distribution of a solids-loaded liquid with different characteristics. It is desirable to provide a better possibility here for the adaptation of such distribution devices for different solids-loaded liquids as well with little effort on the part of the user.

In applications in which distributing devices are used to deliver liquid from an operating vehicle, the additional problem can arise that the volumetric flow fluctuates greatly due to different driving speeds and desired delivery quantities ($m^3$/ha) or is to be varied. There is therefore a need for distributing devices that can be operated variably over a large range with respect to quantity delivered without diminishing the size-reduction effect as a result.

SUMMARY OF THE INVENTION

According to the invention, these problems are reduced and, in many applications, completely resolved by a distributing device with the construction described at the outset, which is characterized by a first eccentric member that is connected to the blade drive shaft and defines a first eccentric axis lying at a distance to the drive shaft axis, and a first cutting blade that is connected to the first eccentric member and has a cutting edge that rests against the first perforated blade disc and can be moved relative to the first perforated blade disc by means of the first eccentric member.

According to the invention, the cutting blade is moved relative to the perforated blade disc by means of an eccentric member. As a result, an eccentric movement of the cutting blade is brought about along the perforated blade disc. It is especially preferred that the cutting blade rotate or allow rotation with the cutting edge overlapping with the movement of the eccentric member in an actively driven manner or passively about the eccentric axis. In this configuration, a rotational movement of the cutting blade about the eccentric axis is overlapped with a rotational movement of the eccentric axis around the blade drive shaft. The cutting blade moves here on a trajectory that is especially tolerant of different viscous characteristics of the solids-loaded liquid and different characteristics of the solids in this liquid and a covers broad range of parameters of such solids-loaded liquids without the need for making structural changes to the cutting blade or perforated blade disc for this purpose. In particular, it is preferred if the cutting blade is pivot-mounted on the eccentric member and can therefore execute a passive rotational movement with respect to the eccentric member. As a result of this passive possibility of movement, the cutting blade can better evade point-wise loads from solids in the liquid relative to the eccentric member; in particular, it is able to cut resistant solids with more favorable leverage and distribute the wear more evenly along the cutting blade that in cutting blades that rotate about a single axis. The blade drive shaft is preferably arranged in the chamber interior space and can extend through the perforated blade disc in order to be pivot-mounted in the perforated blade disc or outside of the distribution chamber.

The liquid loaded with solids is introduced through the inlet opening into the chamber interior space of the distribution chamber. From the chamber interior space, the solids-loaded liquid passes through outlet openings in the perforated blade disc to chamber outlet openings. The number of these chamber outlet openings can correspond to the number of outlet openings in the perforated blade disc or be different therefrom. Upon passing through the outlet openings in the perforated blade disc, the solids are cut down in size by a shearing action that is produced by means of a relative movement of the cutting edge to the perforated blade disc. The cutting blade can preferably be arranged on the side of the perforated blade disc facing toward the chamber interior space or on the side of the perforated blade disc or facing away from the chamber interior space. The cutting blade can be embodied by a single cutting member having one, two or more cutting edges that cooperate with the cutting edges at the outlet openings in the perforated blade disc. Likewise, the cutting blade can be provided by two or more cutting members which, in turn, have one, two or more cutting edges.

According to a first preferred embodiment, the distributing device according to the invention can be further developed by a coupling member that connects the eccentric member to the blade drive shaft and, in a first detent position on the eccentric member, positions the eccentric member in a first eccentricity of the first eccentric axis to the drive shaft axis and, in a second detent position on the eccentric member, positions the eccentric member in a second eccentricity of the first eccentric axis, which is greater than the first eccentricity, to the drive shaft axis. In this embodiment, the eccentricity of the eccentric axis to the drive shaft axis can be changed during operation of the distributing device. For this purpose, a coupling member is provided between the eccentric member and the blade drive shaft that mechanically couples the blade drive shaft to the eccentric member in two detent positions. In doing so, a different eccentricity is achieved in the first detent position than in the second detent position. "Eccentricity" is to be understood here as the gap between the eccentric axis and the drive shaft axis. In this preferred embodiment, the distributing device can be operated with two different eccentricities, and the switch can be made between the first and second eccentricity or the first and second detent position through manual actuation or by exceeding certain operating parameter thresholds such as, for example, certain rotational speeds or torques. For instance, the eccentric member can engage in the first detent position on the coupling member and, upon over- or undershooting a predetermined rotational speed limit of the blade drive shaft or of the cutting blade, move into the detent position, for example by the influence of centrifugal forces or drag torques. Likewise, a switch can be made between the first and the second detent position by a manual, external actuation of a switch lever or other actuating member.

In principle, what must be understood is that, in this embodiment, the eccentric member is positioned binarily either in the first or the second detent position to the coupling member. In one alternative embodiment, however, the eccentric member can also be positioned in positions that lie between these two detent positions to the coupling member or to the drive shaft axis, so that an analog, stepless change in eccentricity is achieved.

According to one especially preferred embodiment, a provision is made that the coupling member is moved back and forth between the first and second detent position by means of a reversal of the direction of rotation of the blade drive shaft. This further development enables functionally easy switchability in many applications between the first and the second detent position or eccentricity by switching the direction of rotation of the blade drive shaft. As a result, the first eccentricity is set, for example, upon clockwise rotation of the blade drive shaft, whereas the second detent position is set upon counterclockwise rotation of the blade drive shaft. In particular, this design can preferably cooperate with cutting blades that have corresponding cutting edges which, depending on the direction of rotation, are engaged with the cutting edges embodied on the perforated blade disc or do not develop any such cutting effect, as a result of which a more uniform distribution of the wearing effect on the cutting blade is achieved.

It is further preferred if the coupling member engages positively in a recess of the first eccentric member. Through a positive torque transmission between coupling member and eccentric member, a reliable detent position and load transmission is achieved, for one. At the same time, a load transmission that is as independent of wear as possible is achieved with a high transmissible torque.

According to another preferred embodiment, a provision is made that the coupling member comprises a cam that engages in the recess of the first eccentric member, and the recess provides a first detent position for the cam for a first direction of rotation of the blade drive shaft and, for a direction of rotation of the blade drive shaft that is opposite to the first direction of rotation, a second detent position. In principle, what must be understood is that the coupling member can comprise or consist of a cam. This cam engages positively in a recess of the first eccentric member and can move in this recess, thus assuming the first and second detent position. This embodiment is particularly suited to bringing about a switch between the first and the second detent position through a reversal of the direction of rotation of the blade drive shaft. The cam can execute a swiveling movement, a rolling movement or a translational straight or arched movement or it can move on a trajectory between the first and second detent position that is composed of two or more of these types of movement. For a compact construction, it is preferred that the coupling member comprise the cam or be constituted by a cam and the recess be embodied in or on the eccentric member. In other structural designs, however, a construction that is inverse thereto can be preferred in which a recess is embodied in or on the coupling member and cooperates with a cam that is embodied on the eccentric member or is connected thereto.

According to another preferred embodiment, a provision is made that the coupling member and the drive shaft are embodied integrally. In this design, the coupling member also constitutes the drive shaft, which can be embodied in this design with a cam profile at least in the region of the eccentric members in order to achieve the cooperation with the recesses in the eccentric members. An integral design of coupling member and drive shaft means here that the drive shaft and the coupling member are embodied in a single piece, particularly by a single component, which simultaneously carries out the function of the drive shaft and the coupling members.

According to another preferred embodiment, a provision is made that a second perforated blade disc with several outlet openings delimits the interior space of the distribution chamber and a second cutting blade is provided that has a cutting edge that rests against the second perforated blade disc and is moveable relative thereto. In this design, the chamber interior space is delimited by two perforated blade discs that are preferably arranged opposite each other and enclose the chamber interior space between them. By virtue of this construction, the number of outlets from the distributing device can be doubled because two sides of the distributing device are used to distribute the solids-loaded liquid to the outlet opening. For instance, the distribution chamber can be embodied in a cylindrical shape, and the perforated blade discs are each arranged on the front side on the cylindrical distribution chamber. It is preferred here if the first and second perforated blade disc are identically constructed and the functionality and constructive design of the first and second cutting blade also correspond to each other.

It is especially preferred if the second cutting blade is connected to the first eccentric member and the cutting edge of the second cutting blade can be moved by means of the first eccentric member relative to the second perforated blade disc. In this embodiment, a movement occurs both of the first and of the second cutting blade by means of the first eccentric member. Both cutting blades thus move with angular synchronism on corresponding trajectories in such a way that the first cutting blade rests against the first perforated blade disc and the second cutting blade rests against the second perforated blade disc, so that the trajectories run parallel at a distance from each other.

It is further preferred that the first and/or the second cutting blade be pivot-mounted on the eccentric member about the first eccentric axis. In this embodiment, the first or second cutting blade is moveably mounted on the first eccentric member by means of an appropriate pivot-mount and can therefore rotate relative to the eccentric member. This rotational movement can particularly be passive, i.e., the cutting blade or cutting blades is/are not coupled with the drive member or the like in order to execute a rotational movement relative to the eccentric member. Instead, during the passive rotational movement, the cutting blade is rotated by cutting forces and frictional forces with respect to the eccentric member, which is driven by the rotation of the blade drive shaft to which the eccentric member is connected. In particular, this embodiment is suitable for an annular cutting blade, in which the cutting edges are embodied on a ring member and circular, that can, for example, be concentric to the eccentric axis of the eccentric member. In this embodiment, it is possible, for example, to provide a corresponding cutting edge on the inner radius of the annular cutting member and on the outer radius of the annular cutting member with which the cutting effect is achieved in cooperation with the cutting edges on the openings in the perforated blade disc.

According to another preferred embodiment, a provision is made that a counterbalance is connected to the blade drive shaft whose center of mass is arranged eccentrically to the drive shaft axis, preferably offset by 180° to the first eccentric shaft axis. By means of a counterbalance, the imbalance brought about by the first eccentric member or by both eccentric members can be balanced out in whole or in part, so that mass balancing is achieved around the blade drive shaft. It must be understood here that the counterbalance can be connected to the blade drive shaft in such a way that it is connected directly and mechanically to the blade drive shaft or is embodied integrally therewith, or by connecting the counterweight member directly and mechanically to the first eccentric member or to the second eccentric member or by embodying it integrally therewith. It is especially preferred to select the mass of the counterweight member and the position of the center of mass of the counterweight member such that, as a result, complete mass balancing is achieved with respect to the mass of the first eccentric member and eccentric components mounted thereon or of the first and second eccentric member and eccentrically moved components mounted thereon. In particular, it is preferred if the counterweight member is detachably or moveably connected to the blade drive shaft and, as a result, a selection can be made from an assortment of counterweight members with different centers of mass in relation to the attachment point to the blade drive shaft or with different masses, or the counterbalance can be moved in order to compensate for different masses or different eccentricities of the first/second eccentric and of the cutting blade mounted thereon.

It is further preferred if the inlet opening defines an inlet direction of the solids-containing liquid that is parallel, preferably coaxial to the drive shaft axis. In the case of such an inflow direction, the solids-loaded liquid is introduced parallel to the drive shaft axis into the chamber interior space and can therefore be distributed more uniformly to the outlet openings. This embodiment is particularly well suited for an arrangement of the inlet opening and outlet openings in a front wall and, optionally, of additional outlet openings in a front wall opposite thereto. Due to the rotationally symmetrical arrangement of the inlet opening and of the outlet openings that is made possible here, all of the outlet openings are pressurized uniformly to the greatest possible extent, and corresponding flow path lengths between the inlet opening and each outlet opening are achieved. The metering accuracy of the distributing device can thus be increased. In other embodiments, instead of an axial direction of flow through the inlet opening, a radial direction of flow through the inlet opening in relation to the drive shaft axis is also possible, for example, by arranging the inlet opening in a housing wall segment that is arranged as a circumferential wall segment around the drive shaft axis.

It is further preferred if a liquid controlling system is arranged in the chamber interior space that is shaped such that the axially inflowing liquid is deflected radially outward on it. By virtue of a liquid controlling system within the distribution chamber, the flow of the solids-containing liquid from the inlet opening to the outlet openings can be guided in a favorable manner, thus preventing outlet openings that lie in the direction of the inflow through the inlet openings from receiving more liquid than other outlet openings. In addition, the precipitation of solids within the distribution chamber, with the danger of the clogging of parts of the chamber interior space, can be reduced or completely prevented. The liquid controlling system can be embodied, for example, in the manner of a baffle with a central raised area facing toward the inlet opening that is inserted into a cylindrically shaped distribution chamber and deflects the incoming liquid flow radially outward starting from a central raised area along a curved wall segment. In particular, it is preferred if this liquid controlling system simultaneously subdivides the distribution chamber into a liquid-conducting chamber interior space and a dry chamber interior space. In this case, the mechanical components can be arranged such that they can move without noteworthy flow resistance and are not subjected to the possibly aggressive action of the solids-containing liquid.

With the liquid flow deflected radially outward in this way, axially aligned liquid flows can then be produced, in turn, through deflection at the inner lateral surface of the cylindrical tube that encloses the baffle. This deflection at the inner lateral surface can occur such that liquid flows are produced in both opposing axial directions, so that the liquid is distributed to outlet openings in both front walls of the distributing device, particularly distributed in equal parts in the two axial directions of flow.

According to another preferred embodiment, the distributing device according to the invention is further developed by a flow channel upstream from the inlet opening in the chamber interior space in the direction of flow and a nozzle with a reduced cross section arranged in this flow channel, followed by an increased cross section in the direction of flow. This modified embodiment resolves a specific problem that occurs in a multiplicity of installation situations of distributing devices when the available space is tight. In the case of such constricted space, a curved pipe section is oftentimes connected to the inlet opening and the solids-containing liquid is fed over this curved pipe section into the inlet opening and the chamber interior space. One consequence of this type of flow routing is that the solids-containing liquid enters the chamber interior space with an inhomogeneous flow, and this renders the uniform metering of the liquid to the outlet openings difficult or impossible. By means of a nozzle that is arranged in the direction of flow in front of the entry of the solids-containing liquid into the chamber interior space, this group of problems can be avoided to the greatest possible extent or completely. As a result of the nozzle, the solids-containing liquid is first accelerated in the region of the narrowing of the cross section, then slowed, in turn, in the region of the enlarged cross section lying downstream from the narrowing. This homogenizes the solids-containing liquid with respect to its direction of flow.

It is particularly preferred in this regard that the second cutting blade be connected to a second eccentric member. Through the provision of a second eccentric member, an eccentric movement of the second cutting blade can be achieved, thus also achieving the same advantages and effects that were already described for the first cutting blade and eccentric member in the second cutting blade as well. It must be understood that the first and second eccentric member can be embodied integrally as a single eccentric member or preferably as two separate eccentric members.

It is further preferred that the second eccentric member be connected to the blade drive shaft and define a second eccentric axis spaced apart from the drive shaft axis. In this embodiment as well, the first and second eccentric axis can match and be coaxial to each other, particularly if first and second eccentric member are integrally embodied by a single eccentric member. It is especially preferred, however, if first and second eccentric axis run at a distance to each other, preferably parallel to each other and spaced apart from each other in order to enable an optimized mode of operation in the configuration of the first and second eccentric member during construction, design or setting of parameters during the operation of the distributing device.

It is further preferred if the second cutting blade is pivot-mounted on the second eccentric member about the second eccentric axis. Again in this embodiment, a passive or active rotational movement of the cutting blade relative to the eccentric member is made possible. As regards the function and construction, reference is made to the preceding description of the first eccentric member and the first cutting blade pivot-mounted thereon.

It is further preferred if the coupling member engages in a recess of the second eccentric member and, in a first detent position within the expansion at the second eccentric member, the second eccentric member is positioned in a first eccentricity of the second eccentric axis to the drive shaft axis and, in a second detent position within the expansion at the second eccentric member, the second eccentric member is positioned in a second eccentricity of the second eccentric axis, which is greater than the first eccentricity, to the drive shaft axis. In this embodiment, the coupling member is also used for the torque transmission and the detent positions on the second eccentric member. It must be understood in this regard that the function of the torque transmission and the detent between the drive shaft and the second eccentric member can be carried out by an integral coupling member that also carries out these functions simultaneously in relation to the first eccentric member or by means of a divided coupling member that is composed of two coupling member components that are arranged at a distance from each other and connected separately to the drive shaft. By virtue of the possibility of also arranging the second eccentric member in two different eccentricities, the possibility is also opened up of arranging the second eccentric axis in a small and a large eccentricity to the drive shaft axis, thus achieving an adaptation of the operating parameters to different viscosities and solid characteristics of the solids-loaded liquid. What is more, this also enables the more variable structuring of the volumetric flow through the distributing device by switching between the first and the second detent position, thus changing the eccentricity of the cutting blades and adjusting the sum of the opening cross sections of the outlet openings to be larger or smaller as a consequence of this change in eccentricity. It must be understood that the switching between the first and second detent position of the second eccentric member on the coupling member can also be done by binary or analog means and can also be achieved through the selection of parameters like with the first eccentric member; in this regard, reference is made to the preceding description of a switching between the first and second detent position by changing the rotational speed or reversing the direction of rotation.

It is further preferred that the second eccentric axis around the drive shaft axis be offset with respect to the first eccentric axis, preferably offset around the drive shaft axis by 180°. This embodiment achieves a more uniform operation of the drive shaft by balancing out the imbalances that are produced by the eccentricities; in particular, good imbalance compensation is achieved if an offset of 180° between the first and the second eccentric axis is implemented. Moreover, as a result of this different arrangement of the eccentric axes, an improved flow dynamic is achieved in the chamber interior space, in which the solids-loaded liquid is passed at mutually opposing positions of the first and second perforated blade disc through the openings in the perforated blade disc, so that locally high flow speeds in the chamber interior space are not required in order to maintain a uniform outflow through the openings.

It is further preferred if the coupling member comprises a cam that engages in the recess of the first eccentric member and the recess provides a first detent position for the cam in a first direction of rotation of the blade drive shaft and, in a direction of rotation of the blade drive shaft opposite to that of the first direction of rotation, a second detent position offset with respect thereto is provided. In this embodiment, as was also described in relation to the coupling member, it must be understood that the cam that drives the second eccentric member can be embodied integrally with the first cam, or a first and second cam part can be present that constitute the cam and achieves the drive for the corresponding first and second eccentric member. Likewise, an inverse construction can also be executed at the second eccentric member in which the cam is embodied on the eccentric member and engages in a recess on the coupling member in order to adjust the first and second detent position.

Furthermore, it is preferred if the first and/or the second cutting blade is annular and preferably embodied on an inner edge and on an outer edge of the first and second cutting blade cutting edges. Through the embodiment of the first and second cutting blade as an annular cutting blade, an especially favorable movement pattern and the possibility of passive movement on the part of the cutting blade is achieved if it is pivot-mounted on the eccentric member. Particularly, the cutting member can sweep along a circular path over openings arranged on the perforated blade disc and alternatingly seal and release them when the cutting blade is moved on the eccentric path. It must particularly be understood in this regard that the first and second cutting blades are made available by an annular structure on which the cutting edges are embodied that are arranged concentrically around the eccentric axis.

Finally, according to another preferred embodiment, a provision is made that the recess has a rounded-off, L-shaped geometry and the cam rests against a first arm of the recess in the first detent position and against a second arm of the recess in the second detent position. By virtue of such an embodiment of recess and cam, a rolling-off of the cam within the L-shaped recess is enabled through the reversal of the direction of rotation of the drive shaft, whereby a positive torque transmission in both detent positions can be reliably put into execution and an especially insensitive and robust load transmission and locking mechanism is provided.

BRIEF DESCRIPTION OF THE DRAWINGS

A preferred embodiment of the invention will be described with reference to the enclosed figures.

FIG. 9 shows a schematic detailed view of the recess and of the cam of the fourth embodiment according to FIGS. 6 and 7.

DETAILED DESCRIPTION OF THE DRAWINGS

Figure 1:
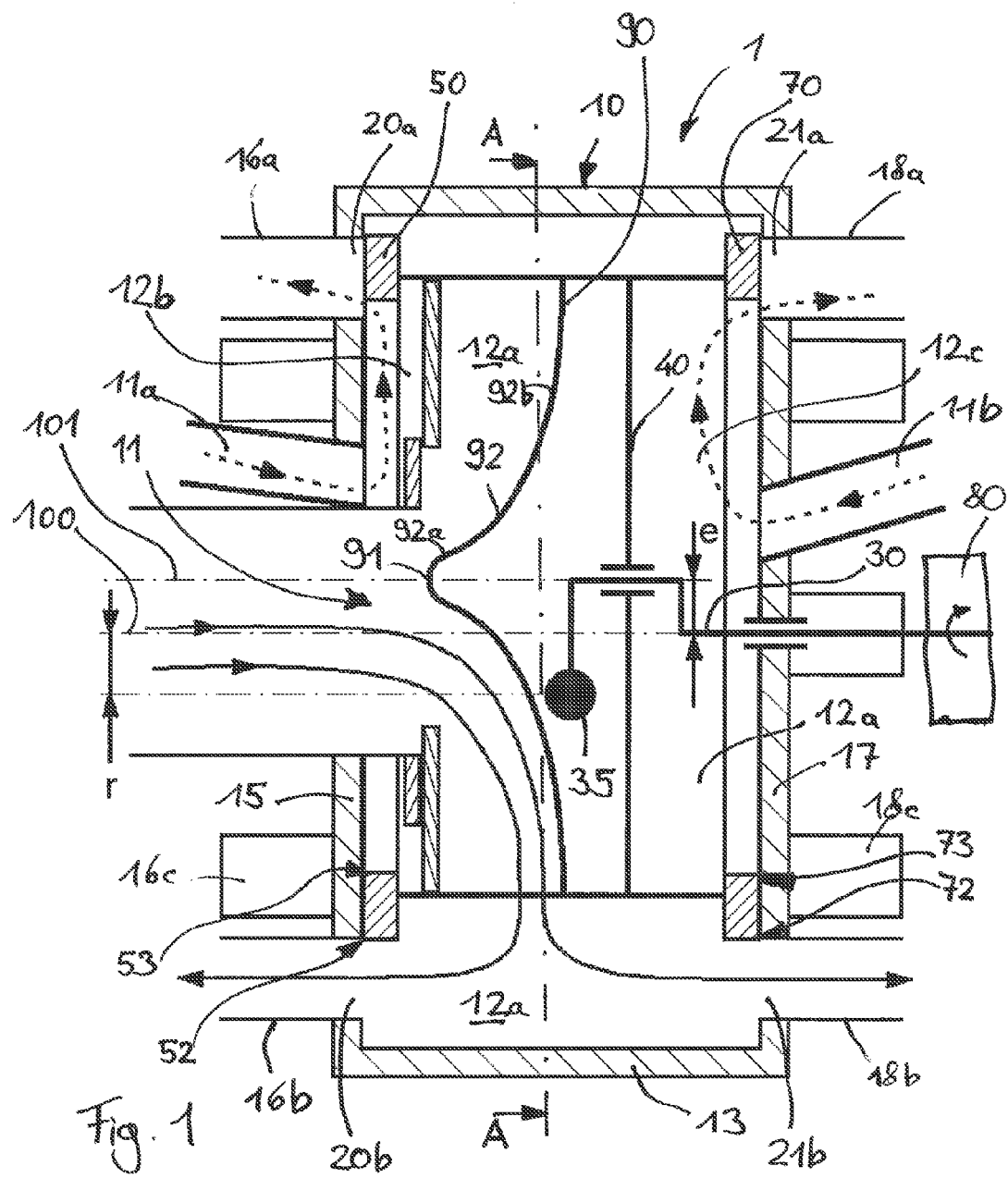
FIG. 1 shows a schematic, longitudinally cut side view of a first preferred embodiment of a distributing device according to the invention.

With reference to FIG. 1 a distributing device 1 is shown that has a cylindrical distribution chamber 10 with an axial inlet opening 11. The distribution chamber 10 has a chamber interior space 12 into which the inlet opening 11 leads through an anterior front wall 15.

The distribution chamber 10 has a cylindrical construction and has a cylindrical side wall 13. An outlet opening (not shown) for solids is arranged in a lower segment of this side wall 13.

The anterior front wall 15 of the distribution chamber has a plurality of connection ports 16 a, b, c, . . . that are embodied as pipe flanges on the side of the front wall 15 facing away from the chamber interior space. Hoses can be plugged onto these connection ports 16a, b, c . . . in order to distribute and deliver the solids-loaded liquid distributed from the distribution chamber to a plurality of hoses.

The posterior front wall 17 opposite the front wall 15 is—with the exception of the inlet opening—embodied so as to match with the anterior front wall 15 and also has a plurality of outlet ports 18 a, b, c, . . . .

The connection ports 16 a, b, c, . . . and 18 a, b, c, . . . are arranged on a circular path. This circular path has a midpoint that lies on a drive shaft axis 100.

Cutting openings 20a, b, . . . and 21a, b, . . . are arranged flush with the connection ports 16a, b, c, . . . to each connection port in the front wall 15 and 17. It is through these cutting openings that the solids-loaded liquid is able to emerge from the chamber interior space 12 and enter the connection ports 16a, b, c, . . . and 18a, b, c, . . . .

A blade drive shaft 30 is arranged in the chamber interior space 12 that extends through a bearing opening in the posterior front wall 17 and is pivot-mounted there about the drive shaft axis 100.

An eccentric 40 is attached to the drive shaft in the chamber interior space adjacent to the anterior front wall 15. The eccentric 40 defines a first eccentric axis 101. The eccentric axis 101 has an eccentricity "e" to the drive shaft axis 100. A first cutting blade 50 and a second cutting blade 70 are pivot-mounted by means of a rolling or sliding bearing (not shown) on the eccentric 40 about the eccentric axis 101. The eccentric axis 101 represents the axis of rotation of the rolling or sliding bearing and the cutting blade 50, 70 about the eccentric 40.

The drive shaft 30 is coupled with a counterbalance 35 whose center of mass is arranged eccentrically to the drive shaft axis 100 by the amount r. The center of mass of the counterbalance 35 is offset by 180° with respect to the eccentric axis 101. The distance r and the mass of the counterbalance 35 are dimensioned such that, in comparison to the eccentricity E and the mass of the eccentric 40 and the eccentrically moved components attached thereto, a first-order mass balancing of the moved masses is achieved about the drive shaft axis 100. In particular, the inertial forces of the liquid can also be compensated for by means of the counterweight.

The first cutting blade 50 rests with an outer cutting edge 52 and an inner cutting edge 53 flush against the inner wall of the anterior front wall 15 facing toward the chamber interior space. The outer cutting edge 52 and the inner cutting edge 53 thus cooperate with the edges of the openings 20a,b of the circularly arranged cutting openings in the anterior front wall 15 and bring about a shearing action on solids that pass through these outlet openings when the cutting blade 50 moves.

In the same manner, an outer and inner cutting edge 72, 73 of the second cutting blade 70 rests against the inner wall surface of the posterior front wall 17 and cooperates with the cutting edges of the openings 21a,b, . . . when the cutting blade 70 moves relative to the posterior front wall 17.

The drive shaft 30 is coupled outwardly to the chamber interior space with a drive motor 80 that causes the blade drive shaft to rotate and, as a result, also allows the eccentric 40 to rotate about the drive shaft axis. As a result of the passive rotatability of the cutting blades 50, 70 about the eccentric axis 101, the cutting blades execute a movement in the manner of a lapping process on the inner surfaces of the front walls 15, 17.

A liquid baffle 90 is attached to the eccentric 40 that moves with the eccentric. The liquid baffle 90 has a central raised area 91 that points in the direction toward the inlet opening 11. Starting from this raised area 91, the liquid baffle 90 is provided with a curved surface 92 that runs from an axial orientation 92a to a radial orientation 92b.

The liquid baffle diverts the liquid entering through the inlet opening 11 from its axial direction of flow into a radial direction of flow, thus conducting it uniformly to the outlet openings 20a,b, . . . and 21a,b, . . . . This deflection is performed to a stronger degree to those outlet openings that happen to be open due to the eccentric movement and not closed by the cutting blades 50,70; this is achieved because the liquid baffle 90 moves along with the eccentric and the raised area 91 consequently circles eccentrically to the inlet opening on a circular path and is respectively located opposite the open outlet openings in relation to the drive shaft axis 100.

The chamber interior space 12 is divided into a liquid-conducting space 12a, a first air-conducting space 12b and a second air-conducting space 12c by the liquid baffle 90 and by a stationary ring wall segment 15a arranged in the region of the inlet opening 11 and a ring wall segment 40a mounted on the eccentric 40 and moved along therewith that slides in a sealing manner onto the ring wall segment 15a.

The air-conducting space 12b is arranged adjacent to the cutting blade 50 that rests against the anterior front wall 15. An air inlet port 11a enables ambient air to enter the air-conducting space 12b. In the eccentric arrangement shown, this ambient air is conducted through the air-conducting space 12b to the outlet opening 16a.

In commensurately mirror-inverted fashion, an air inlet port 11b is arranged in the front wall 17 that enables air to enter the air-conducting space 12c and air to be conducted through the outlet opening 21a and the connection ports 18a in the depicted eccentric position.

The cutting blades 50, 70 have a cross-sectional width that is less that the diameter of the outlet openings 20a, b, . . . and 21a, b, . . . . It is thus achieved that, at each point in time of the eccentric movement, the outlet openings 20a, b, . . . and 21a, b, . . . are either in fluid communication with the liquid-conducting segment 12a of the chamber interior space or in fluid communication with the air-conducting segment 12b and 12c. This always-existing fluid communication makes it possible for the liquid that passes through the outlet openings upon opening of one of the outlet openings 20 a, b, . . . and 21a, b, . . . , thus producing a moving liquid column in the connection ports 16a, b, . . . and 18a, b, . . . not to be abruptly decelerated by the closure of the outlet openings 20a, b, . . . , 21a, b, . . . if the cutting blade has continued to move as a result of the eccentric movement but rather can continue to move unimpeded after blocking of the entry of liquid through aeration. As a result, a practically constant, acceleration-free movement of a liquid/air mixture through the connection ports 16a, 18a and hose or pipe lines connected thereto is achieved, and the seals and components within the distributing device are protected from exposure to high mechanical and hydraulic pulsed loads.

Figure 2:
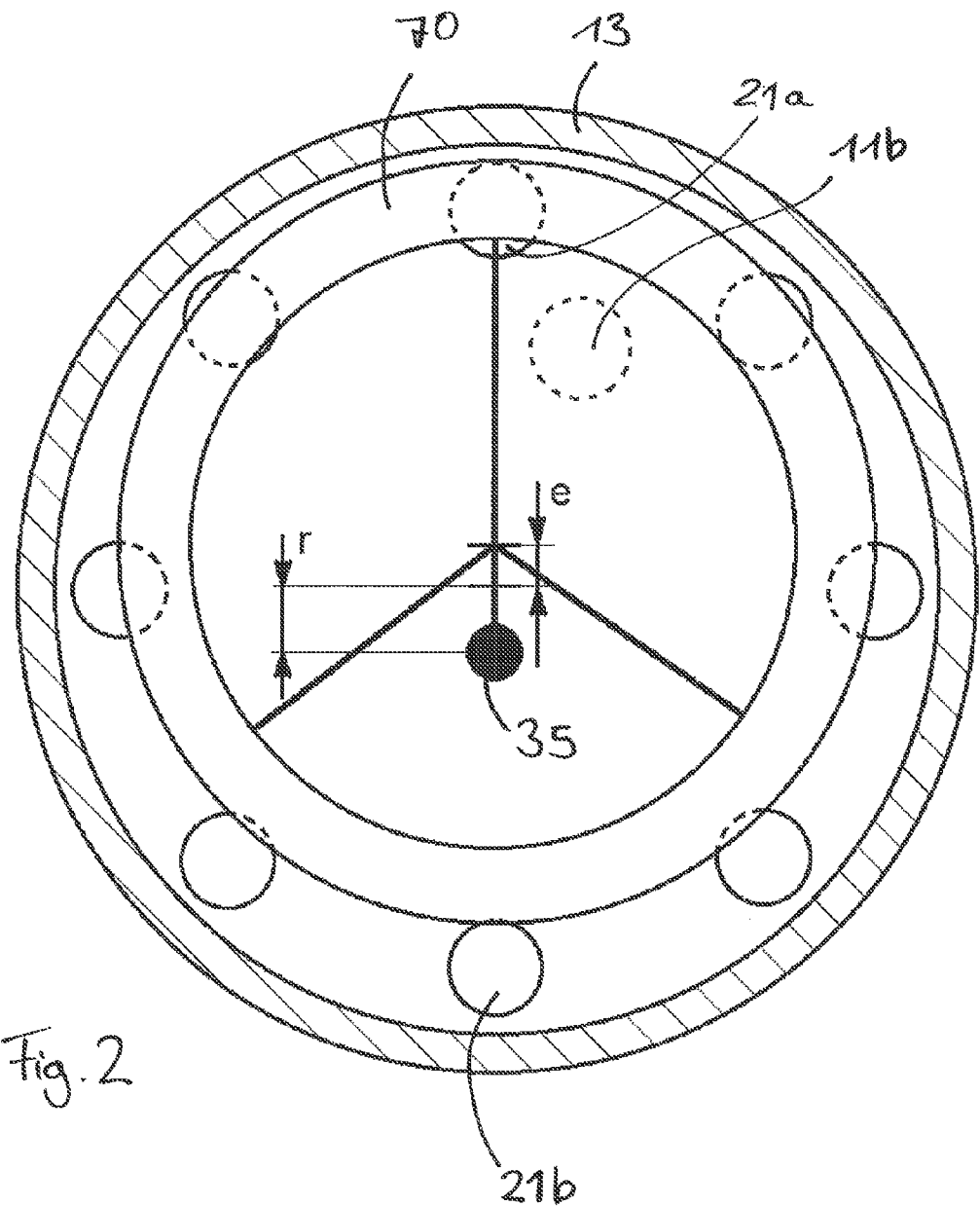
FIG. 2 shows a section along the line A-A in FIG. 1.

FIG. 2 shows a schematic, cross-sectional view of the embodiment according to FIG. 1. One can see that, in the eccentric position shown, in which the eccentric is at 12 o'clock in relation to the drive shaft axis, the lowest inlet opening 21b is completely open and the highest inlet opening 21a is completely closed. The other openings are closed to a small extent (openings at 4 and 8 o'clock), half-closed (openings at 3 and 9 o'clock) and partially open (openings at 11 and 1 o'clock). Through the eccentric movement of the cutting blade 70, this opening situation changes in a continuous and ongoing manner.

Figure 3:
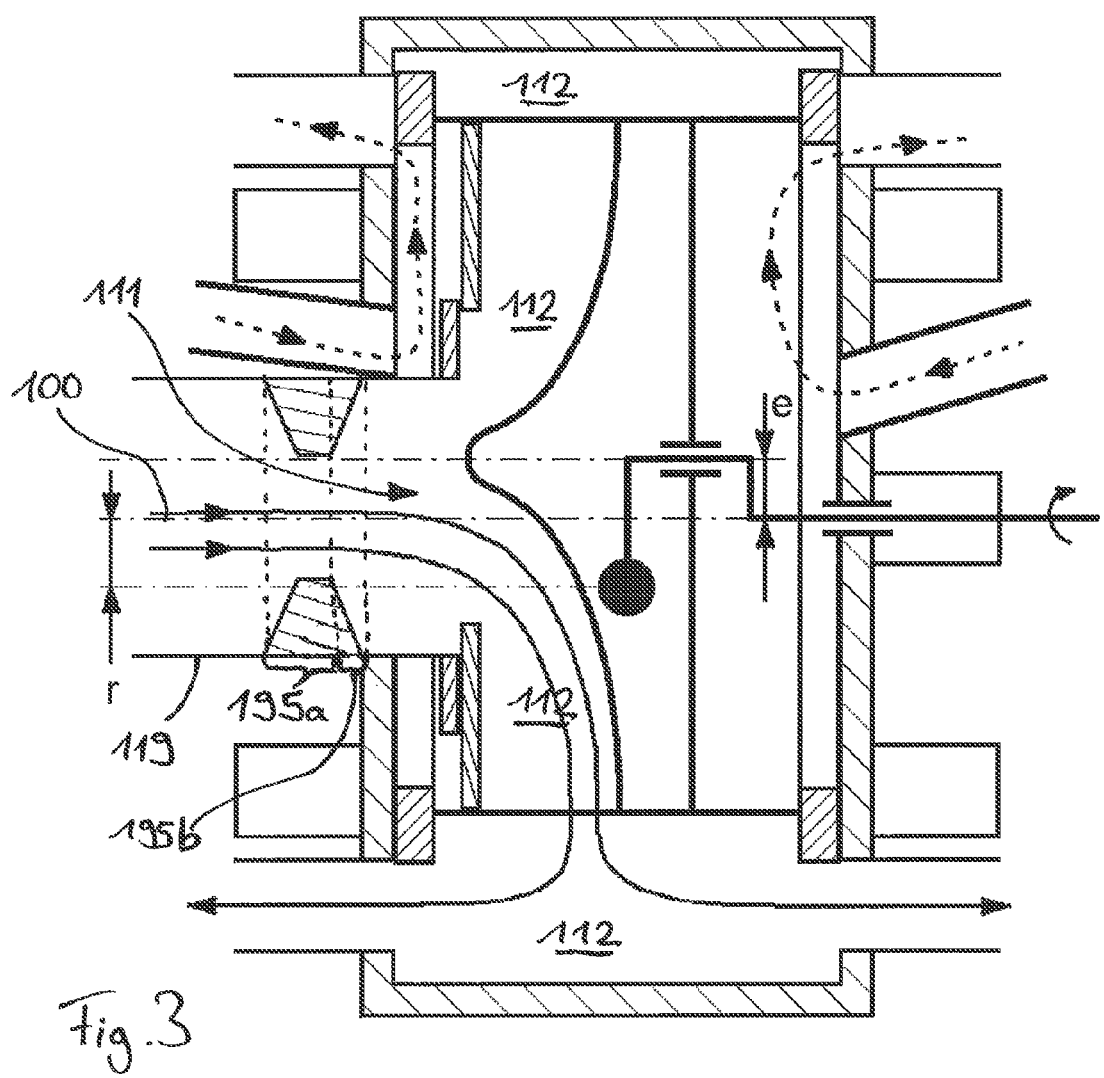
FIG. 3 shows a longitudinally cut top view of a second preferred embodiment of a distributing device according to the invention.

FIG. 3 shows a view according to FIG. 1 of a second embodiment of the invention. The second embodiment of the invention corresponds for the most part to the first embodiment and will be described below only with respect to its differences.

In the second embodiment, the solids-containing liquid is also fed through an inlet opening 111 that lies in the direction of flow behind an inlet channel 119.

The inlet channel 119 is arranged axially in relation to the drive shaft axis 100, and the liquid flows through it axially into the cylindrical chamber interior space 112.

A nozzle 195 is arranged in the inlet channel 119 that brings about a narrowing of the cross section with subsequent widening of the cross section in the inlet channel 119. As a result, the liquid is first accelerated in the region of the cross-sectional narrowing 195a, only to be decelerated again as a result in the region of the cross-sectional widening 195b. This acceleration and deceleration result in a homogenization of the direction of liquid flow, whereby the liquid enters the chamber interior space 112 in an approximately axial direction of flow. As a result of this further development, the second embodiment is insensitive to manners of connection to the inlet channel 119 that work with pronounced curvatures of a connected feed hose for the solids-containing liquid in order to enable operation of the distributing device according to the invention in constricted spaces as well.

Figure 4:
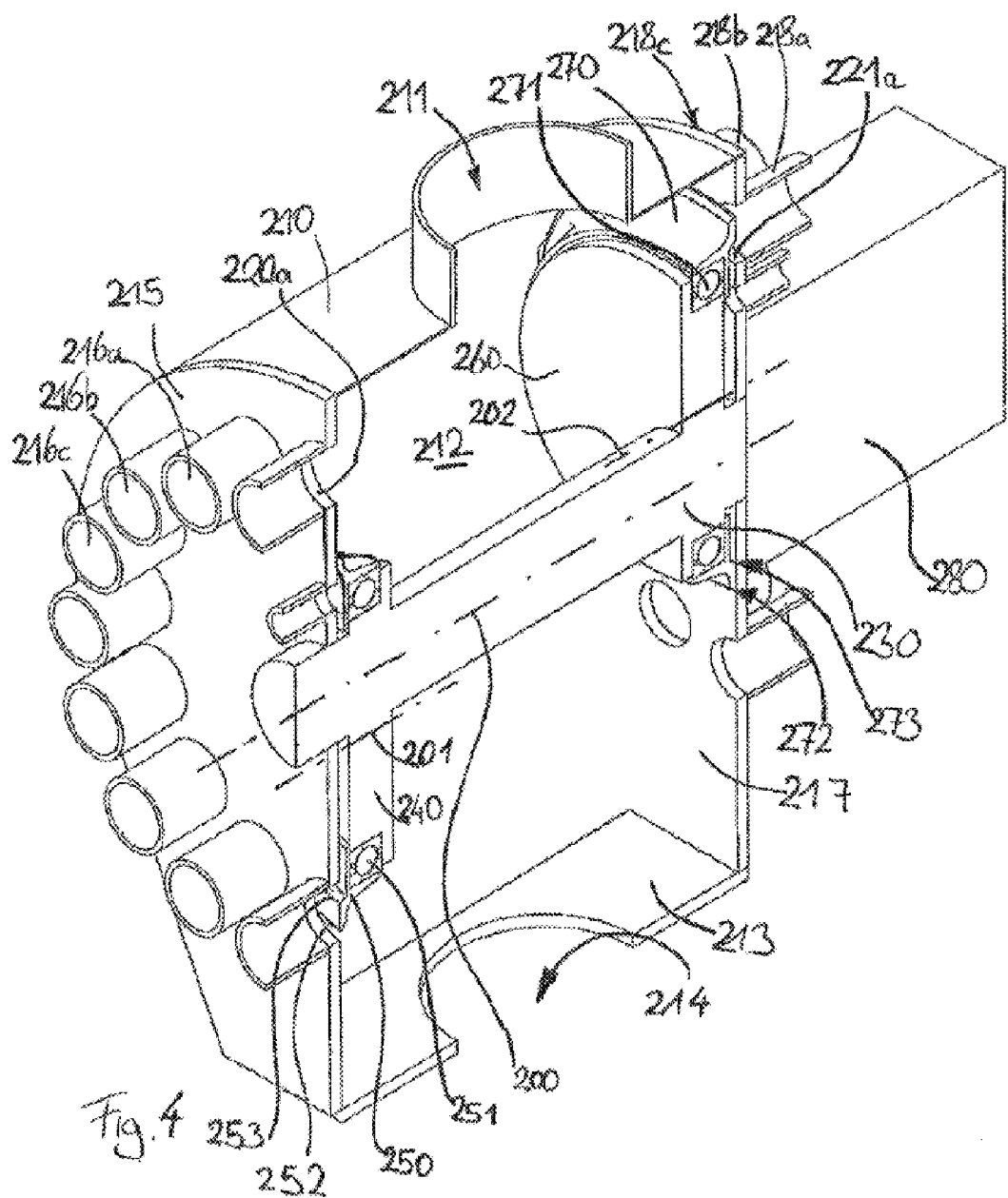
FIG. 4 shows a schematic, perspective, longitudinally cut view of a third preferred embodiment of a distributing device according to the invention.
Figure 5:
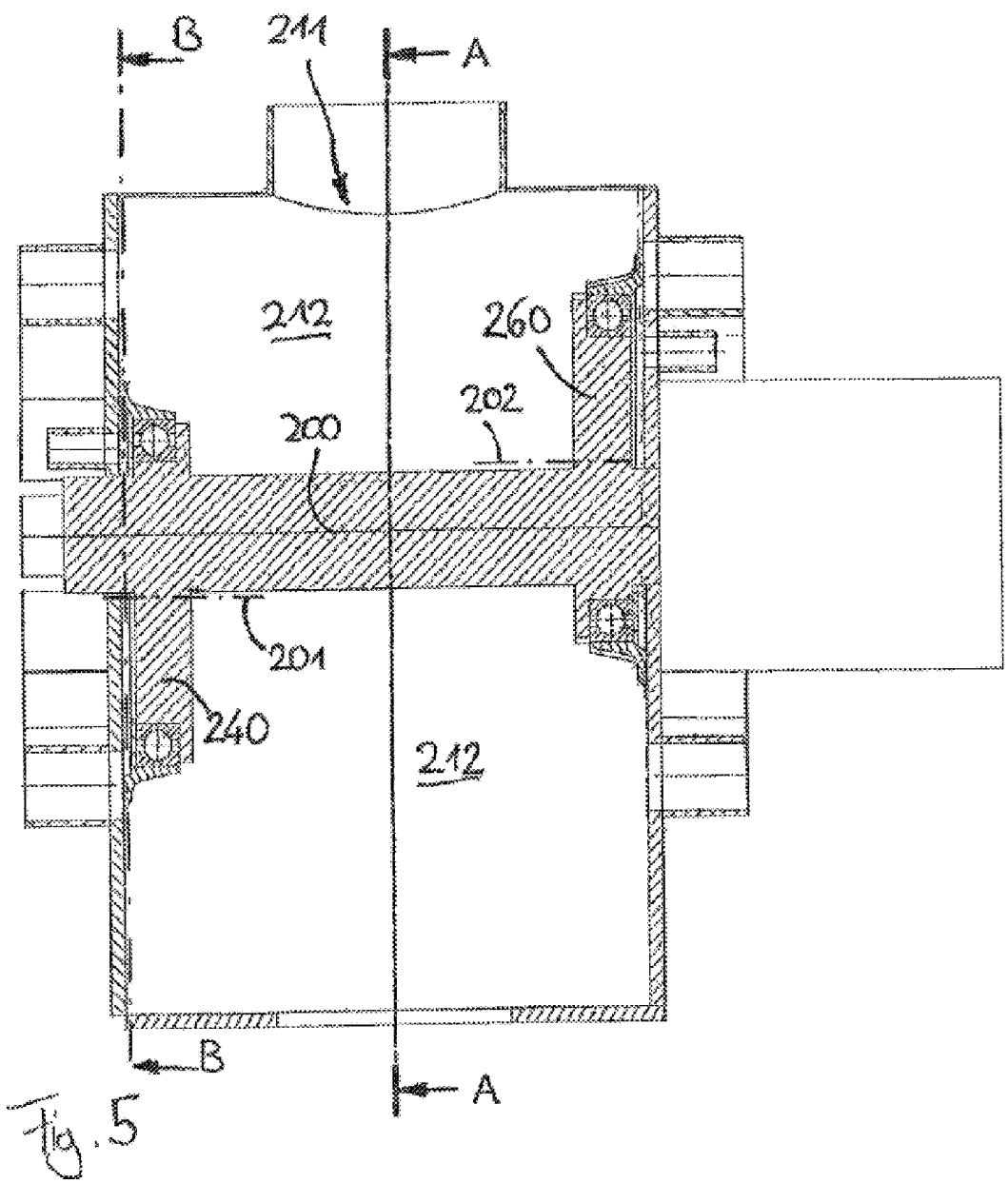
FIG. 5 shows a longitudinally cut side view of the distributing device according to FIG. 4, FIGS. 6 a-d show a sequence of a rotation of the cutting blade on the perforated blade disc in a sectional representation along the section A-A in FIG. 2.

With reference to FIGS. 4 and 5, a third embodiment of the distributing device according to the invention is shown which has a distribution chamber 210 with an inlet opening 211. The distribution chamber 210 has a chamber interior space 212 to which the inlet opening 211 leads.

The distribution chamber 210 has a cylindrical structure in the upper portion and runs downward to a trapezoidal cross section with a conical wall profile. An outlet opening 214 for solids is arranged in a lower housing floor 213 that is arranged opposite the inlet opening 211 in the upper region of the distribution chamber.

An anterior front wall 215 of the distribution chamber has a plurality of connection ports 216 a, b, c, . . . that are embodied as pipe flanges on the side of the front wall 215 facing away from the chamber interior space. Hoses can be plugged onto these connection ports 216 in order to distribute and deliver the solids-loaded liquid distributed from the distribution chamber to a plurality of hoses.

The posterior front wall 217 opposing the front wall 215 is embodied congruently to the anterior front wall 215 and also has a plurality of outlet ports 218 *a, b, c,* . . . .

The connection ports 216 *a, b, c,* . . . and 218 *a, b, c,* . . . are arranged on a circular path. This circular path has a midpoint that lies on a drive shaft axis 100.

Cutting openings 220*a* and 221*a* to each connection port in the front wall 215 and 217 are arranged flush with the connection ports 216*a*, 216*b*, 216*c*, . . . . As a result of these cutting openings, the solids-loaded liquid can enter from the chamber interior space 212 into the connection ports 216*a, b, c,* . . . and 218*a, b, c,* . . . .

A blade drive shaft 230 is arranged in the chamber interior space 212 that extends on both sides through bearing openings in the front walls 215, 217 and is pivot-mounted there about the drive shaft axis.

A first eccentric 240 is attached to the drive shaft in the chamber interior space adjacent to the anterior front plate 215 on which a first cutting blade 250 is pivot-mounted by means of a rolling bearing 251. The first eccentric 240 defines a first eccentric axis 201. The eccentric axis 201 represents the axis of rotation of the rolling bearing 251 and of the cutting blade 250 about the eccentric 240. Opposite thereto, a second eccentric 260 is attached to the blade drive shaft in the chamber interior space adjacent to the posterior front wall 217 that defines a second eccentric axis 202. The second eccentric axis 202 is at the same distance from the drive shaft axis 100 as the first eccentric axis 201 but is offset by 180° to the first eccentric axis 201 about the drive shaft axis 100.

A second cutting blade 70 is pivot mounted about second eccentric axis 202 on the second eccentric 260 by means of rolling bearing 271. Instead of a rolling bearing 251, 271, a sliding bearing can also be provided.

The first cutting blade 250 rests with an outer cutting edge and an inner cutting edge flush against the inner wall of the anterior front wall 215 facing toward the chamber interior space. The outer cutting edge 252 and the inner cutting edge 253 thus cooperate with the edges of the openings 220*a,b* of the circularly arranged cutting openings in the anterior front plate and bring about a shearing action on solid that pass through these outlet openings when the cutting blade 250 moves.

Similarly, an outer and inner cutting edge 272, 273 rests against the inner wall surface of the posterior front wall 217 and cooperates with the cutting edges of the openings 221*a*, . . . when the cutting blade 270 moves relative to the posterior front wall 217.

The drive shaft 230 is coupled outward to the chamber interior space with a drive motor 280 that causes the blade drive shaft to rotate and, as a result, also permits the eccentric 240, 260 to rotate about the drive shaft axis.

FIGS. 6*a-d* show a profile of an eccentric movement in a sectional representation according to section A-A in FIG. 5. As can be seen, a portion of the outlet openings 220*a, b, c* is closed by the cutting blade 250, another number of outlet openings 220*a, b, c,* . . . is partially closed, and another number of outlet openings 220*a, b, c* . . . is not closed. As a result of the depicted eccentrically circling movement of the cutting blade about the drive shaft axis 200, all outlet openings are swept over by the cutting blade, so that a cutting effect for solids is achieved in cooperation with the edges of the outlet openings 220*a, b, c*, and the outlet openings are alternatingly opened and closed, thus enabling passage of the liquid.

Figure 7:
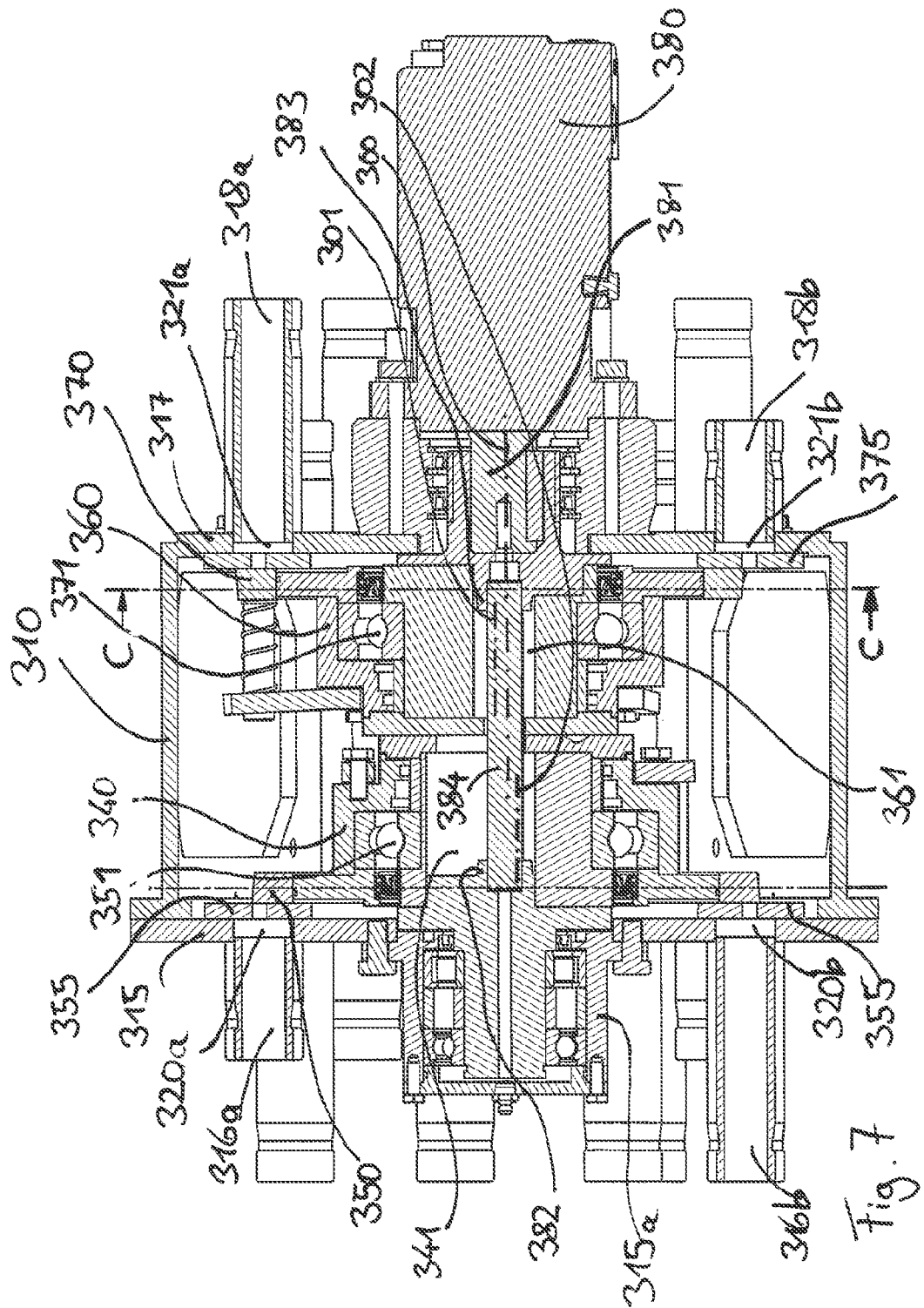
FIG. 7 shows a longitudinally cut side view of a fourth preferred embodiment of a distributing device according to the invention.

FIG. 7 shows a longitudinally cut top view of a fourth embodiment of a distributing device according to the invention. The embodiment according to FIGS. 7 and 8 is characterized by a adjusting mechanism that can adjust the eccentricity of the eccentric axis between a small and a large eccentricity.

Figure 8:
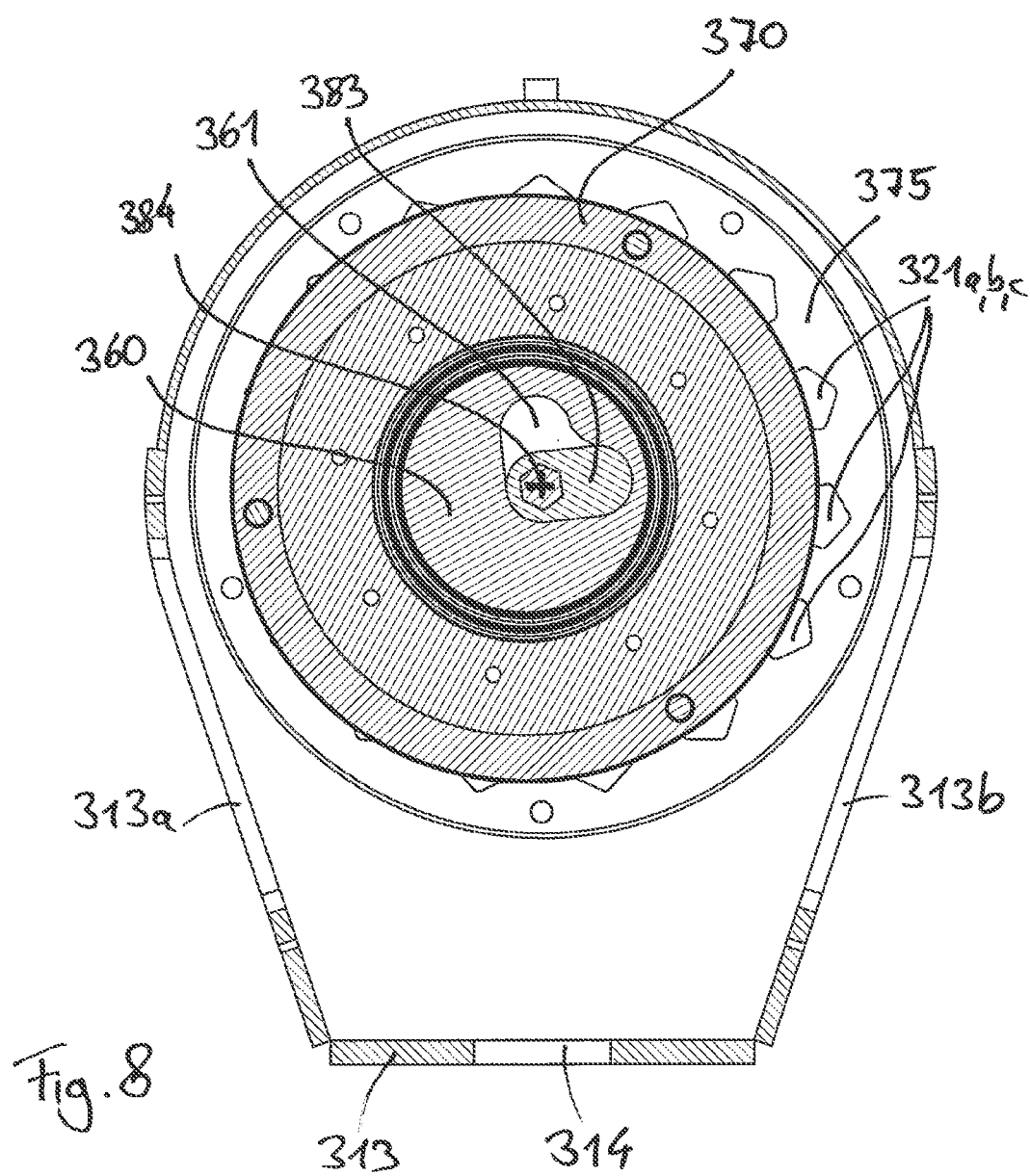
FIG. 8 shows a cross-sectional view along the line C-C in FIG. 7 in a first detent position.

Like in the preceding embodiments, the distributing device according to FIGS. 7 and 8 has a distribution chamber housing 310 in which an inlet opening (not shown) is arranged that leads radially from above into the distribution chamber in this fourth embodiment. On the front side, the distribution chamber is closed by front walls 315, 317 in which several circularly arranged outlet openings 320*a, b,* 321*a, b,* are arranged that communicate flushly with outlet ports 316*a, b,* 318*a, b.*

An outlet opening 314 for solids is arranged in a floor plate 313, and maintenance openings 313*a, b* are present in the downwardly conically converging side walls through which it is possible to access the interior space of the distribution chamber.

A first eccentric 340 and a second eccentric 360 are arranged in the distribution chamber. The first eccentric defines a first eccentric axis 301, and the second eccentric defines a second eccentric axis 302 that is offset to the first eccentric axis 301 by 180° in relation to a drive shaft axis 300. The eccentrics 340, 360 therefore move phase-shifted by 180° with respect to each other (as described above, phase-shifting will not work in the new embodiment), thus providing first-order mass balancing about the drive shaft axis 300.

A cutting blade 350 is pivot-mounted on the first eccentric 340 by means of a rolling bearing 351; analogously, a cutting blade 370 is pivot-mounted on the second eccentric 360 by means of a rolling bearing 371.

The eccentrics 340, 360 are coupled by means of cams 382, 383 with a drive journal 381 of a drive motor 380. The cams 382, 383 each have a hexagonal hole through which a hexagonal rob 384 is passed.

The cam 383 is connected in a torque-proof manner by means of a fitting key to the drive journal 381. The torque from this cam 382 is transferred to the cam 383 via a hexagonal rod 384. The cam 382 is pivot-mounted about the drive shaft axis by means of a rolling or sliding bearing, here a cylindrical sliding bearing and a rolling bearing in a bearing housing 315*a*.

When the drive motor 380 drives in the clockwise direction (corresponding to a counterclockwise rotation of the eccentric 360 in the view according to FIG. 8), the cam 383 assumes the position shown in FIG. 8. In this position, the eccentric axis 302 has a first eccentricity to the drive shaft axis 300.

If the direction of rotation of the drive motor 380 is reversed and the drive motor is operated in the counterclockwise direction, then the cam 383 swivels within an L-shaped recess 361 in the eccentric 360 into a second detent position. The segment of the cam 383 through which the hexagonal rod passes moves into the free space of the recess 361 shown in FIG. 8 and, in view according to FIG. 8, the cam executes a swiveling movement of 90° in the clockwise direction. The eccentricity of the eccentric axis 301 to the drive shaft axis 300 occurring after this swiveling movement is greater than the first eccentricity, whereby the cutting blade 370 is guided on a path with greater eccentricity.

In an analogous but mirror-inverted construction with respect to a central cross-sectional surface, a corresponding drive is achieved by the cam 382 in the first eccentric 340 as well, and switching between a small and large eccentricity is achieved through a reversal of the direction of rotation of the motor 380.

The arrangement of the recess 361, 341 in the eccentrics 340, 360 and the cams 382, 383 is selected such that both eccentrics 340, 360 are always located in a congruent eccentricity to the drive shaft axis 300.

Through the possibility of switching between a small and a large eccentricity, it is made possible in the embodiment according to FIGS. 7 and 8 to achieve low and high throughput in the distributing device. In the case of the small eccentricity, the throughput openings in a perforated blade disc 355, 375, which are arranged adjacent to the front walls 315 and 317, are always partially or completely closed, as can be seen from FIG. 8.

In contrast, in the case of a large eccentricity, these openings in the perforated blade discs are completely opened in the region opposite the eccentric axis, completely closed on the side of the eccentric axis, and partially open in the regions laterally thereto, thus resulting in an overall greater delivery of liquid through the openings at constant internal pressure in the distribution chamber. When using the distributing device behind pressure pumps such as centrifugal pumps or on a compressor tank cart, for example, the volumetric flow through the distributing device can be immediately increased as a result. When using the distributing device behind a displacement pump, a different housing pressure would be produced upon adjustment of the eccentricity, and the operating point of the displacement pump would have to be adapted to the increased throughput, or the distributing device can be adapted to different volumetric flows of the displacement pump.

FIG. 9 shows the kinematics of the adjusting mechanism of the cam 383 in the recess 361. As can be seen from this figure, the cam can assume a first position with low eccentricity A between an eccentric axis 302 and the drive shaft axis 300 and, upon reversal of the direction of rotation, swivel to a second position by rolling within the recess, executing a swiveling movement of 90° and then coming to rest in the previously free segment of the recess. In this second position, the can is also arranged in the recess for the positive transmission of torques and now has a second eccentricity B between an eccentric axis 302 and the drive shaft axis 300 that is greater than the eccentricity A.

We claim:

1. A distributing device for liquids, comprising:
a distribution chamber with an inlet opening that leads to a chamber interior space of the distribution chamber,
a first perforated blade disc with several outlet openings that connect the chamber interior space to several connection ports,
a blade drive shaft that is swivel-mounted about a drive shaft axis,
a first eccentric member that is connected to the blade drive shaft and defines a first eccentric axis spaced apart from the drive shaft axis, and
a first cutting blade that is connected to the first eccentric member and has a cutting edge that rests against the first perforated blade disc and can be moved relative to the first perforated blade disc by the first eccentric member,
wherein a coupling member connects the first eccentric member to the blade drive shaft and, in a first detent position on the first eccentric member, positions the first eccentric member in a first eccentricity of a first eccentric axis to the drive shaft axis and, in a second detent position on the first eccentric member, positions the first eccentric member in a second eccentricity of a first eccentric axis that is greater than the first eccentricity to the drive shaft axis.

2. The distributing device of claim 1, wherein the coupling member is moved back and forth between the first and second detent positions by reversing a direction of rotation of the blade drive shaft.

3. The distributing device of claim 1,
wherein the coupling member engages positively in a recess of the first eccentric member.

4. The distributing device of claim 3,
wherein the coupling member comprises a cam that engages in the recess of the first eccentric member, and the recess provides a third detent position for the cam for a first direction of rotation of the blade drive shaft and, for a direction of rotation of the blade drive shaft that is opposite to the first direction of rotation, a fourth detent position.

5. The distributing device of claim 4,
wherein at least one of the cam and a second cam engages in the recess of the first eccentric member, and the recess provides a fifth detent position for the at least one of the cam and the second cam for a first direction of rotation of the blade drive shaft and, for a direction of rotation of the blade drive shaft that is opposite to the first direction of rotation, a sixth detent position.

6. The distributing device of claim 4,
wherein the recess has a rounded-off, L-shaped geometry and the cam rests against a first arm of the recess in the third detent position and, in the fourth detent position, against a second arm of the recess.

7. The distributing device of claim 1,
wherein the coupling member and the blade drive shaft are embodied integrally.

8. The distributing device of claim 1,
wherein a second perforated blade disc with several outlet openings delimits the chamber interior space of the distribution chamber and a second cutting blade is provided that has a cutting edge that rests against the second perforated blade disc and can be moved relative thereto.

9. The distributing device of claim 8,
wherein the second cutting blade is connected to the first eccentric member and the cutting edge of the second cutting blade can be moved relative to the second perforated blade disc by the first eccentric member.

10. The distributing device of claim 8,
wherein at least one of the first and the second cutting blades is pivot-mounted on the first eccentric member about the first eccentric axis.

11. The distributing device of claim 8,
wherein the second cutting blade is connected to a second eccentric member.

12. The distributing device of claim 11,
wherein the second eccentric member is connected to the blade drive shaft and defines a second eccentric axis lying at a distance to the drive shaft axis that does not run coaxially to the first eccentric axis.

13. The distributing device of claim 12,
wherein the second cutting blade is pivot-mounted on the second eccentric member about the second eccentric axis.

14. The distributing device of claim 12,
wherein the coupling member engages in a recess of the second eccentric member and, in a third detent position on the second eccentric member, the second eccentric member is positioned in a first eccentricity of the second eccentric axis to the drive shaft axis and, in a fourth detent position on the second eccentric member, the second eccentric member is positioned in a second eccentricity of the second eccentric axis, which is greater than the first eccentricity, to the drive shaft axis.

15. The distributing device of claim 11, wherein a second eccentric axis of the second eccentric member is offset about the drive shaft axis to the first eccentric axis by approximately 180° about the drive shaft axis.

16. The distributing device of claim 8, wherein at least one of the first cutting blade and the second cutting blade is annular and has at least one circumferential cutting edge that rests against the first perforated blade disc or the second perforated blade disc and is embodied on an inner edge and on an outer edge of the first cutting blade or the second cutting blade.

17. The distributing device of claim 8, wherein:
a ventilation opening is present in the first perforated blade disc that leads to a space described by an inner edge of the cutting edge of the first cutting blade,
a distance between the first eccentric axis to the drive shaft axis and a diameter of an outer edge of the cutting edge of the first cutting blade is selected such that the cutting edge or the outer edge moves on an eccentric path that encompasses a surface into which the ventilation opening leads,
wherein a distance between the inner edge and the outer edge of at least one of the first cutting blade and the second cutting blade is less than or equal to a diameter of each of the several outlet openings in the first perforated blade disc.

18. The distributing device of claim 1, wherein a counterweight member is connected to the blade drive shaft whose center of mass is arranged eccentrically to the drive shaft axis and offset by approximately 180° to the first eccentric axis.

19. The distributing device of claim 1, wherein the inlet opening defines an inlet direction of solids-containing liquid that lies parallel and coaxial to the drive shaft axis.

20. The distributing device of claim 19, wherein a liquid controlling system is arranged in the chamber interior space that is shaped such that axially inflowing liquid is deflected radially outward on it.

21. The distributing device of claim 1, further comprising a flow channel upstream from the inlet opening in the chamber interior space in a direction of flow and a nozzle with a reduced cross section arranged in this flow channel, followed by an increased cross section in the direction of flow.

22. A distributing device for liquids, comprising:
a distribution chamber with an inlet opening that leads to a chamber interior space of the distribution chamber,
a first perforated blade disc with several outlet openings that connect the chamber interior space to several connection ports,
a blade drive shaft that is swivel-mounted about a drive shaft axis,
a first eccentric member that is connected to the blade drive shaft and defines a first eccentric axis spaced apart from the drive shaft axis, and
a first cutting blade that is connected to the first eccentric member and has a cutting edge that rests against the first perforated blade disc and can be moved relative to the first perforated blade disc by the first eccentric member,
wherein a second perforated blade disc with several outlet openings delimits the chamber interior space of the distribution chamber and a second cutting blade is provided that has a cutting edge that rests against the second perforated blade disc and can be moved relative thereto, and
wherein the second cutting blade is connected to the first eccentric member and the cutting edge of the second cutting blade can be moved relative to the second perforated blade disc by the first eccentric member.

23. A distributing device for liquids, comprising:
a distribution chamber with an inlet opening that leads to a chamber interior space of the distribution chamber,
a first perforated blade disc with several outlet openings that connect the chamber interior space to several connection ports,
a blade drive shaft that is swivel-mounted about a drive shaft axis,
a first eccentric member that is connected to the blade drive shaft and defines a first eccentric axis spaced apart from the drive shaft axis,
a first cutting blade that is connected to the first eccentric member and has a cutting edge that rests against the first perforated blade disc and can be moved relative to the first perforated blade disc by the first eccentric member, and
a flow channel upstream from the inlet opening in the chamber interior space in a direction of flow and a nozzle with a reduced cross section arranged in this flow channel, followed by an increased cross section in the direction of flow.

24. A distributing device for liquids, comprising:
a distribution chamber with an inlet opening that leads to a chamber interior space of the distribution chamber,
a first perforated blade disc with several outlet openings that connect the chamber interior space to several connection ports,
a blade drive shaft that is swivel-mounted about a drive shaft axis,
a first eccentric member that is connected to the blade drive shaft and defines a first eccentric axis spaced apart from the drive shaft axis, and
a first cutting blade that is connected to the first eccentric member and has a cutting edge that rests against the first perforated blade disc and can be moved relative to the first perforated blade disc by the first eccentric member,
wherein a second perforated blade disc with several outlet openings delimits the chamber interior space of the distribution chamber and a second cutting blade is provided that has a cutting edge that rests against the second perforated blade disc and can be moved relative thereto,
wherein the second cutting blade is connected to a second eccentric member, and
wherein the second eccentric member is connected to the blade drive shaft and defines a second eccentric axis lying at a distance to the drive shaft axis that does not run coaxially to the first eccentric axis.

25. A distributing device for liquids, comprising:
a distribution chamber with an inlet opening that leads to a chamber interior space of the distribution chamber,
a first perforated blade disc with several outlet openings that connect the chamber interior space to several connection ports,
a blade drive shaft that is swivel-mounted about a drive shaft axis, a first eccentric member that is connected to the blade drive shaft and defines a first eccentric axis spaced apart from the drive shaft axis, a first cutting blade that is connected to the first eccentric member and has a cutting edge that rests against the first perforated blade disc and can be moved relative to the first perforated blade disc by the first eccentric member, and a flow channel upstream from the inlet opening in the chamber interior space in a direction of flow and a nozzle with a reduced cross section arranged in this flow channel, followed by an increased cross section in the direction of flow, wherein a second cutting blade is pivot-mounted on a second eccentric member about a second eccentric axis.

26. A distributing device for liquids, comprising:

a distribution chamber with an inlet opening that leads to a chamber interior space of the distribution chamber, a first perforated blade disc with several outlet openings that connect the chamber interior space to several connection ports, a blade drive shaft that is swivel-mounted about a drive shaft axis, a first eccentric member that is connected to the blade drive shaft and defines a first eccentric axis spaced apart from the drive shaft axis, and a first cutting blade that is connected to the first eccentric member and has a cutting edge that rests against the first perforated blade disc and can be moved relative to the first perforated blade disc by the first eccentric member, wherein a second perforated blade disc with several outlet openings delimits the chamber interior space of the distribution chamber and a second cutting blade is provided that has a cutting edge that rests against the second perforated blade disc and can be moved relative thereto, wherein the second cutting blade is connected to a second eccentric member, and wherein a second eccentric axis of the second eccentric member is offset about the drive shaft axis to the first eccentric axis by approximately 180° about the drive shaft axis.

27. A distributing device for liquids, comprising:

a distribution chamber with an inlet opening that leads to a chamber interior space of the distribution chamber, a first perforated blade disc with several outlet openings that connect the chamber interior space to several connection ports, a blade drive shaft that is swivel-mounted about a drive shaft axis, a first eccentric member that is connected to the blade drive shaft and defines a first eccentric axis spaced apart from the drive shaft axis, and a first cutting blade that is connected to the first eccentric member and has a cutting edge that rests against the first perforated blade disc and can be moved relative to the first perforated blade disc by means of the first eccentric member, wherein a second perforated blade disc with several outlet openings delimits the chamber interior space of the distribution chamber and a second cutting blade is provided that has a cutting edge that rests against the second perforated blade disc and can be moved relative thereto and wherein:

a ventilation opening is present in the first perforated blade disc that leads to a space described by an inner edge of the cutting edge of the first cutting blade, a distance between the first eccentric axis to the drive shaft axis and a diameter of an outer edge of the cutting edge is selected such that the cutting edge or the outer edge moves on an eccentric path that encompasses a surface into which the ventilation opening leads, and a distance between the inner edge and the outer edge of at least one of the first cutting blade and the second cutting blade is less than or equal to a diameter of each of the several outlet openings in the first perforated blade disc.

\* \* \* \* \*

UNITED STATES PATENT AND TRADEMARK OFFICE
CERTIFICATE OF CORRECTION

PATENT NO. : 9,833,786 B2  
APPLICATION NO. : 14/490757  
DATED : December 5, 2017  
INVENTOR(S) : Martin Hertwig et al.

Page 1 of 1

It is certified that error appears in the above-identified patent and that said Letters Patent is hereby corrected as shown below:

On the Title Page

In Item (30), under Foreign Application Priority Data, delete "20 2013 008 267 U" and insert --20 2013 008 267.4-- therefor.

Signed and Sealed this  
Twenty-eighth Day of May, 2019

Andrei Iancu  
*Director of the United States Patent and Trademark Office*